United States Patent [19]

Tierney, III

[11] Patent Number: 4,837,643
[45] Date of Patent: Jun. 6, 1989

[54] CIRCUIT FOR CONTROLLING FREQUENCY AND PHASE OF VOLTAGE CONTROLLED OSCILLATOR IN A DATA SMOOTHER FOR A STREAMING CARTRIDGE TAPE DRIVE

[75] Inventor: James V. Tierney, III, Costa Mesa, Calif.

[73] Assignee: Archive Corporation, Costa Mesa, Calif.

[21] Appl. No.: 928,471

[22] Filed: Nov. 7, 1986

[51] Int. Cl.$^4$ ............................................. G11B 5/09
[52] U.S. Cl. ..................................... 360/51; 360/45; 307/511
[58] Field of Search ................ 360/51, 45, 39, 46, 360/26, 36.1, 36.2; 375/119, 120; 307/511; 358/337, 339

[56] References Cited

U.S. PATENT DOCUMENTS

| | | | |
|---|---|---|---|
| 3,849,671 | 11/1974 | Molack | 307/511 |
| 4,003,086 | 1/1977 | Larsen et al. | 360/51 |
| 4,127,878 | 11/1978 | Johnson, Jr. et al. | 360/51 |
| 4,321,483 | 3/1982 | Dugan | 307/269 |
| 4,400,817 | 8/1983 | Sumner | 375/119 |
| 4,433,424 | 2/1984 | Taber et al. | 360/51 |
| 4,470,082 | 9/1984 | Van Pelt et al. | 360/51 |
| 4,473,805 | 9/1984 | Guhn | 307/511 |
| 4,528,601 | 7/1985 | Moriyama et al. | 360/46 |
| 4,534,044 | 8/1985 | Funke et al. | 360/51 |
| 4,542,351 | 9/1985 | Okada | 375/120 |
| 4,644,420 | 2/1987 | Buchan | 360/51 |
| 4,682,121 | 8/1987 | Chapman | 375/120 |

OTHER PUBLICATIONS

Archive Drawing No. 50315-002.
IBM Technical Reference Manual, 5-¼ Inch Diskette Adapter, D-48 Logic Diagrams, Apr. 1983.

Primary Examiner—Alan Faber
Assistant Examiner—Surinder Sachar
Attorney, Agent, or Firm—Knobbe, Martens, Olson & Bear

[57] ABSTRACT

A data smoother for a streaming cartridge tape drive includes a circuit for generating a clock signal and a circuit for comparing the phase of the clock signal with the phase of the data signal input to the data smoother. The frequency of the clock signal is increased when the data signal leads the clock signal by an amount which is directly proportional to the phase difference between the clock signal and the data signal, and the frequency of the clock signal is decreased when the data signal lags the clock signal by an amount which is directly proportional to the phase difference between the clock signal and the data signal.

38 Claims, 8 Drawing Sheets

CIRCUIT FOR CONTROLLING FREQUENCY AND PHASE OF VOLTAGE CONTROLLED OSCILLATOR IN A DATA SMOOTHER FOR A STREAMING CARTRIDGE TAPE DRIVE

BACKGROUND OF THE INVENTION

This invention relates to streaming cartridge tape drives, and more particularly to a streaming cartridge tape drive incorporating a data smoother for removing phase and certain frequency variations in the data signal read from magnetic tape by the tape drive.

Streaming cartridge tape drives provide mass storage of magnetic information by writing long streams of serial data in a plurality of parallel streams on magnetic tape. The magnetic tape includes many such parallel data streams, each stream being written at a different vertical position on the tape. When the tape drive completes writing a serial data stream along the entire length of the tape at one vertical position on the tape, the tape drive reverses the direction of the tape and writes another serial data stream at a second vertical position on the tape. This back and forth method of recording data in a plurality of parallel streams on magnetic tape is called serpentine recording, and is well known in the streaming cartridge tape drive art.

Serpentine recording is advantageous in that it maximizes the amount of magnetic tape utilized by eliminating tape starts and stops inherent in tape drives along the entire width of the tape. To achieve high data transfer rates, streaming cartridge tape drives have relatively high speed transport systems which transport the magnetic tape past the magnetic heads at rates of speed of up to 90 inches per second.

Magnetic information is recorded on the tape as a series of magnetic poles, the transition between each differing magnetic pole representing a bit of information. The magnetic poles are produced by providing an alternating write current to the magnetic write head. The write current is first provided in one direction in the winding of the magnetic head to produce a magnetic pole and then in the opposite direction in the winding to produce an opposite magnetic pole on the tape. Although the magnetic write heads are energized by the tape drive at a uniform rate, the magnetic transitions are not written to the tape at uniform positions for a number of reasons.

First, the speed at which the magnetic tape passes by the write head varies. This speed variation is caused in part by speed variation in the transport system which moves the tape as well as by stretching of the tape in response to the varying tension applied by the tape transport system. As a result of this tape speed variation, the frequency of the magnetic transitions written to the tape varies. This variation is of relatively low frequency, generally ranging from as low as 50 Hz to approximately 5000 Hz at the high end.

Another factor which contributes to the nonuniform spacing of magnetic transitions on the tape is a phenomenon known as "peak shift." Peak shift, which results from magnetic interference effects when the magnetic transitions are recorded, is a relatively high frequency effect, with a frequency generally on the order of the nominal data rate of the tape drive. In addition, noise also contributes to high frequency variation of the data on the tape.

Data recovery systems for retrieving the data from the tape after it has been recorded generally include some type of data smoother in order to reduce the high frequency variations in the data signal induced by peak shift. However, the data smoother preserves the relatively low frequency data variations induced by the tape transport system so that no complex data input-/output buffering system is required in the data smoother. Thus, the frequency at which data leaves the data smoother generally tracks the frequency at which data enters the data smoother, except that high frequency variations due to peak shift and noise are removed from the data signal prior to being output by the data smoother.

To accomplish the foregoing, this type of data smoother generates an internal clock signal which tracks the low frequency variations in the data signal caused by the tape transport system, but ignores the relatively high frequency peak shift variations. This clock signal, which is used to control the rate at which data is output from the data smoother, is usually generated by an oscillator. The oscillator is generally coupled to some type of phase comparator which is used to vary the oscillator's rate of oscillation based upon the phase difference detected between the data signal input to the data smoother and the internal clock signal.

Various methods have been used to vary the frequency of the clock signal based upon the detected phase difference between the data and clock signals. For example, in one method, each leading edge of the data signal input to the data smoother is delayed by a fixed amount and then compared with the trailing edge of a clock signal generated by an oscillator in order to determine whether to increase or decrease the frequency of its oscillation. This fixed delay of the leading edge of the data signal, which is based upon the nominal data rate of the system, causes this type of data smoother to adjust the frequency of the clock signal even though it may correspond to the actual data rate.

In other methods of adjusting the frequency of the clock signal, a digital counter may be used to detect the amount of phase difference by generating a count which relates to the phase difference. However, since only a discrete number of counts are provided by the counter, the sensitivity with which the phase difference is detected is limited, and thus the output of the counter is not directly proportional to the actual phase difference. As a result, the frequency of the clock signal is not adjusted by an amount directly proportional to the actual phase difference.

SUMMARY OF THE INVENTION

The present invention is a data smoother for a streaming cartridge tape drive. The data smoother includes a circuit for generating a clock signal and a circuit for comparing the phase of the clock signal to the phase of a data signal input to the data smoother. The frequency of the clock signal is increased when the data signal leads the clock signal by an amount which is directly proportional to the phase difference between the clock signal and the data signal, and the frequency of the clock signal is decreased when the data signal lags the clock signal by an amount which is directly proportional to the phase difference between the clock signal and the data signal. The data smoother also provides an output data signal which is generated from the input data signal and output at a rate which is controlled by the clock signal.

Another feature of the invention includes the phase adjustment of the clock signal to correspond to the phase of the data signal after frequency lock has been established.

The objects, features, and advantages of the present invention will be apparent from the following detailed description of one preferred embodiment of the invention, which is made with reference to the drawings, a brief description of which is provided below.

DETAILED DESCRIPTION OF A PREFERRED EMBODIMENT

Figure 1:
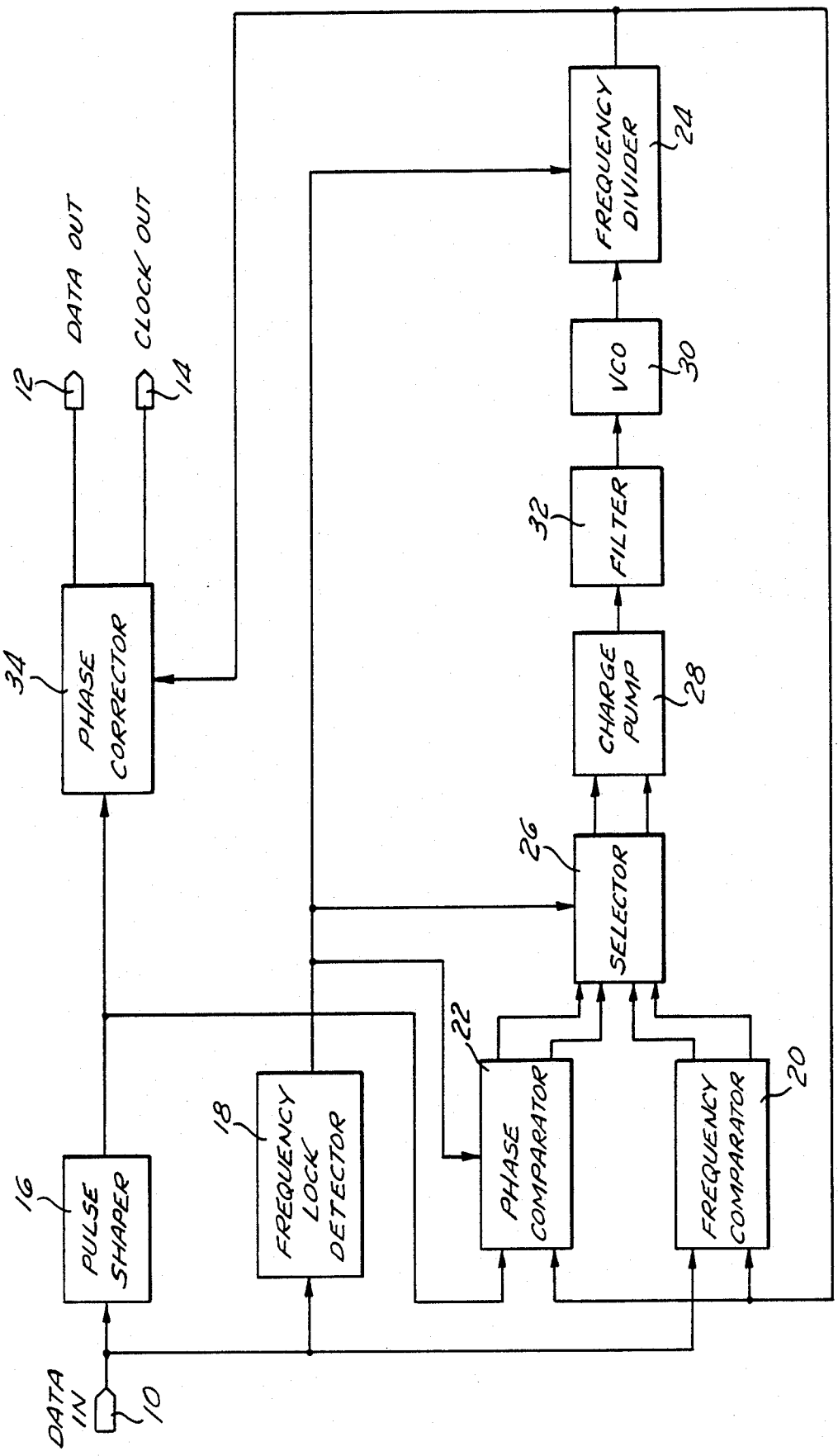
FIG. 1 is a block diagram of one embodiment of the invention.

FIG. 1 illustrates a preferred embodiment of a data smoother for a streaming cartridge tape drive in block diagram form. Magnetic information is read from magnetic tape by a conventional magnetic read head (not shown) and supplied to a data input 10 of the data smoother. There may be conventional signal processing circuitry (not shown) connected between the magnetic read head and the data input 10.

The data which is input to the data smoother has phase and frequency variations, which include a high frequency component resulting from the peak shift phenomenon described above as well as a lower frequency component produced by the magnetic tape transport system (not shown) of the tape drive. The data smoother eliminates the high frequency peak shift component of the frequency variations but preserves the low frequency component. A data stream corresponding to the input data stream is output by the data smoother at a data output 12. The data smoother also provides a clock signal at an output 14 which corresponds in frequency to the output data stream. Thus, both the data output stream and the clock signal have relatively low frequency variations due to the tape speed variations, but they do not have the high frequency peak shift component of frequency variation.

The data input 10 is connected to a pulse shaper 16 that narrows the width of each data pulse and a frequency lock detector 18 which determines when the data smoother has established frequency lock with the incoming stream of data. Frequency lock, which occurs when the clock signal of the data smoother corresponds in frequency to the incoming data stream, is established during the preamble of each block of data.

The frequency lock detector 18 performs two basic functions. First, it determines whether a frequency comparator 20 or a phase comparator 22 will adjust the frequency of the data smoother clock signal. Each block of magnetic information on the tape has a preamble which consists of 80 consecutive magnetic transitions. When the preamble is supplied to the data smoother, the frequency lock detector 18 selects the frequency comparator 20 to control the frequency of the clock signal until frequency lock is established between the preamble data and the clock signal. Upon frequency lock, the frequency lock detector 18 disables the frequency comparator 20 and selects the phase comparator 22 to control the frequency of the clock signal for the remainder of the block of data.

The second basic function of the frequency lock detector 18 is to ensure that the data following the preamble is in phase with the clock signal. To this end, the frequency lock detector 18 is connected to a frequency divider 24 which generates the data smoother clock signal. Just after frequency lock is detected, the detector 18 causes the frequency divider 24 to be reset so that the data immediately following the preamble is in phase with the clock signal produced by the frequency divider 24.

The phase comparator 22 and the frequency comparator 20 are connected to a selector 26 which selectively passes their outputs to a charge pump 28 in accordance with a select signal supplied by the frequency lock detector 18. The charge pump 28 is coupled to a voltage-controlled oscillator 30 through a filter 32.

In operation, the comparator which is selected supplies a signal to the charge pump 28 which is indicative of the phase difference between the data smoother clock signal and the input data. The charge pump 28 causes the voltage supplied to the voltage-controlled oscillator 30 to vary by an amount directly proportional to the phase difference. Since the frequency of oscillation of the oscillator 30 depends on the voltage supplied, the frequency of the oscillator 30 is adjusted to correspond to the frequency of the input data stream. The filter 32 coupled between the charge pump 28 and the oscillator 30 filters out all signal variations supplied by the charge pump 28 which have a frequency corresponding to the high frequency peak shift variations, but allows the lower frequency variations caused by the tape transport system to pass to the oscillator 30.

The oscillator 30 drives the frequency divider 24 which supplies the clock signal to a phase corrector 34. The phase corrector 34, which is coupled to the pulse shaper 16, outputs data from the data smoother at a rate controlled by the clock signal. The frequency of the clock signal is one-eighth of the frequency of the voltage-controlled oscillator 30. Thus, since the clock signal frequency tracks the oscillator 30 frequency, although at a lower rate, the data and clock signals output by the data smoother do not exhibit relatively high frequency variations due to peak shift, but do exhibit lower frequency variations due to the tape transport system.

Figure 3:
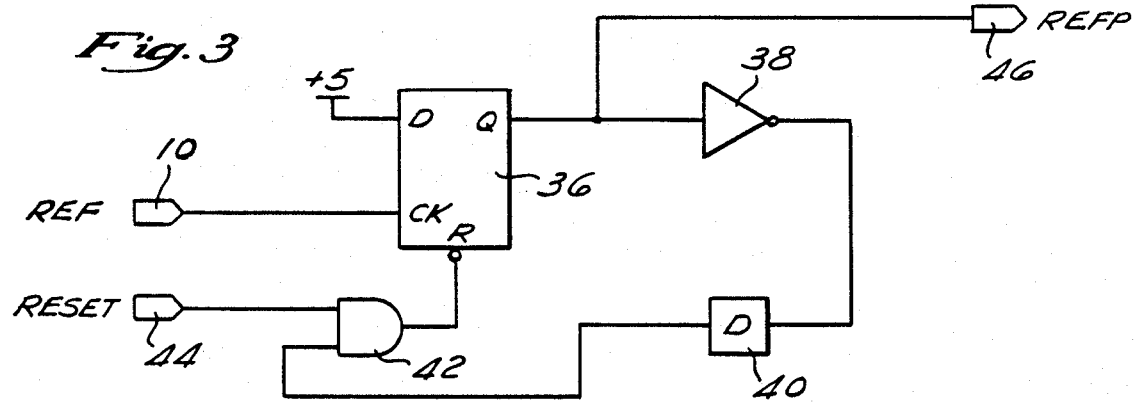
FIG. 3 is a circuit diagram of the pulse shaper of FIG. 1.

Referring now to FIG. 3, a circuit diagram of the pulse shaper 16 is shown. The data ("REF") signal clocks a D flip-flop 36. Upon each rising edge of the REF signal, the output Q of the flip-flop 36 rises to logic "1" since the D input is tied to a high voltage. When the Q output rises to logic "1," the flip-flop 36 is quickly reset, thus causing the Q output to change to logic "0." This automatic resetting of the flip-flop 36 is caused by the connection of its Q output to its reset input through an inverter 38, a delay element 40, and an AND gate 42. Thus, it can be seen that when the Q output rises to logic "1," the output of the inverter 38 falls to logic "0" and is supplied to the reset pin, which resets the flip-flop 36 whenever the reset pin input is logic "0." Thus, the flip-flop 36 is quickly reset each time its Q output rises to logic "1," and its Q output only stays logic "1" for a period of time equal to the signal delay through the circuit elements 38, 40, 42. The AND gate 42 is also connected to receive a reset ("RESET") signal from an input 44, which allows the flip-flop 36 to be reset whenever the value of the RESET signal is logic "0." The shaped data ("REFP") signal is output from the pulse shaper 16 at an output 46.

Figure 2:
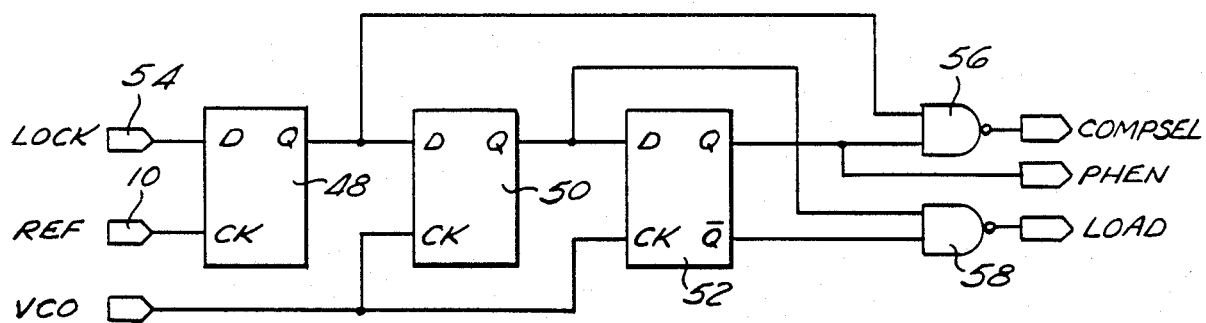
FIG. 2 is a circuit diagram of the frequency lock detector of FIG. 1.

The REF signal is also supplied to the frequency lock detector 18, the circuit diagram of which is shown in FIG. 2. The frequency lock detector 18 comprises three D flip-flops 48, 50, 52. A frequency lock ("LOCK") signal is provided to the first flip-flop 48 from an input 54. The LOCK signal is generated by conventional circuitry (not shown).

As described above, frequency lock is established during the preamble of each data block. Each such preamble consists of 80 consecutive flux reversals on the tape. Since data other than the preamble does not include so many consecutive flux reversals, the preamble can be distinguished from the data which follows. The circuitry which generates the LOCK signal detects the occurrence of 80 consecutive magnetic flux reversals and provides a logic "1" LOCK signal upon such detection. Although the LOCK signal only detects the occurrence of the preamble, frequency lock will have been established when the preamble has been completely input to the data smoother. This is because the length of the preamble was chosen to ensure that the voltage-controlled oscillator 30 has enough time to adjust its frequency to that of the preamble. Thus, when the last bit of the preamble is supplied at the data input 10, frequency lock will have been established and the LOCK signal is logic "1." The LOCK signal is reset to logic "0" at the end of each data block.

Another function of the frequency lock detector 18 is to provide a signal to select either the phase comparator 22 or the frequency comparator 20. For this purpose, a NAND gate 56 has its two inputs connected to the Q outputs of the flip-flops 48, 52 to provide a comparator select ("COMPSEL") signal. At the start of each data block while the preamble is being supplied to the data smoother, the LOCK signal will be logic "0" and thus the Q outputs of the flip-flops 48, 50, 52 will also be logic "0." With the Q outputs at logic "0," the output of the NAND gate 56 will be logic "1," which acts to enable the output of the frequency comparator 20 and disable the output of the phase comparator 22. When the LOCK signal changes to logic "1," the Q output of the flip-flop 48 will change to logic "1" upon the rising edge of the next data pulse of the REF signal. However, since the Q output of flip-flop 52 will still remain at logic "0" for two more clock periods of the voltage-controlled oscillator ("VCO") signal by which it is clocked, the COMPSEL signal will remain logic "1" for two more periods of the VCO signal, at which time it will change to logic "0," thus enabling the output of the phase comparator 22 and disabling the output of the frequency comparator 20.

The frequency lock detector 18 provides a phase comparator enable ("PHEN") signal to enable the phase comparator 22. After frequency lock is detected, the PHEN signal becomes logic "1" when the Q output of flip-flop 52 goes high. When the PHEN signal is logic "1," the phase comparator 22 becomes responsive to data input. When the PHEN signal is logic "0" at all other times, the output of the phase comparator 22 is disabled.

The frequency lock detector 18 also generates a frequency divider load ("LOAD") signal which is provided to the frequency divider 24 in order to make an initial adjustment of the phase of the clock signal generated by the frequency divider 24 after the preamble has been received. In FIG. 2, the LOAD signal is supplied by a NAND gate 58 with one of its inputs connected to the output of flip-flop 52. When it is logic "0," the LOAD signal adjusts the phase of the clock signal. The LOAD signal becomes logic "0" exactly once during the input of each data block, just after frequency lock has been detected. When the LOAD signal is logic "1," it has no effect on the frequency divider 24. This signal phase adjustment of the clock signal just after the preamble of each data block is described below in more detail in connection with the frequency divider 24.

Figure 7:
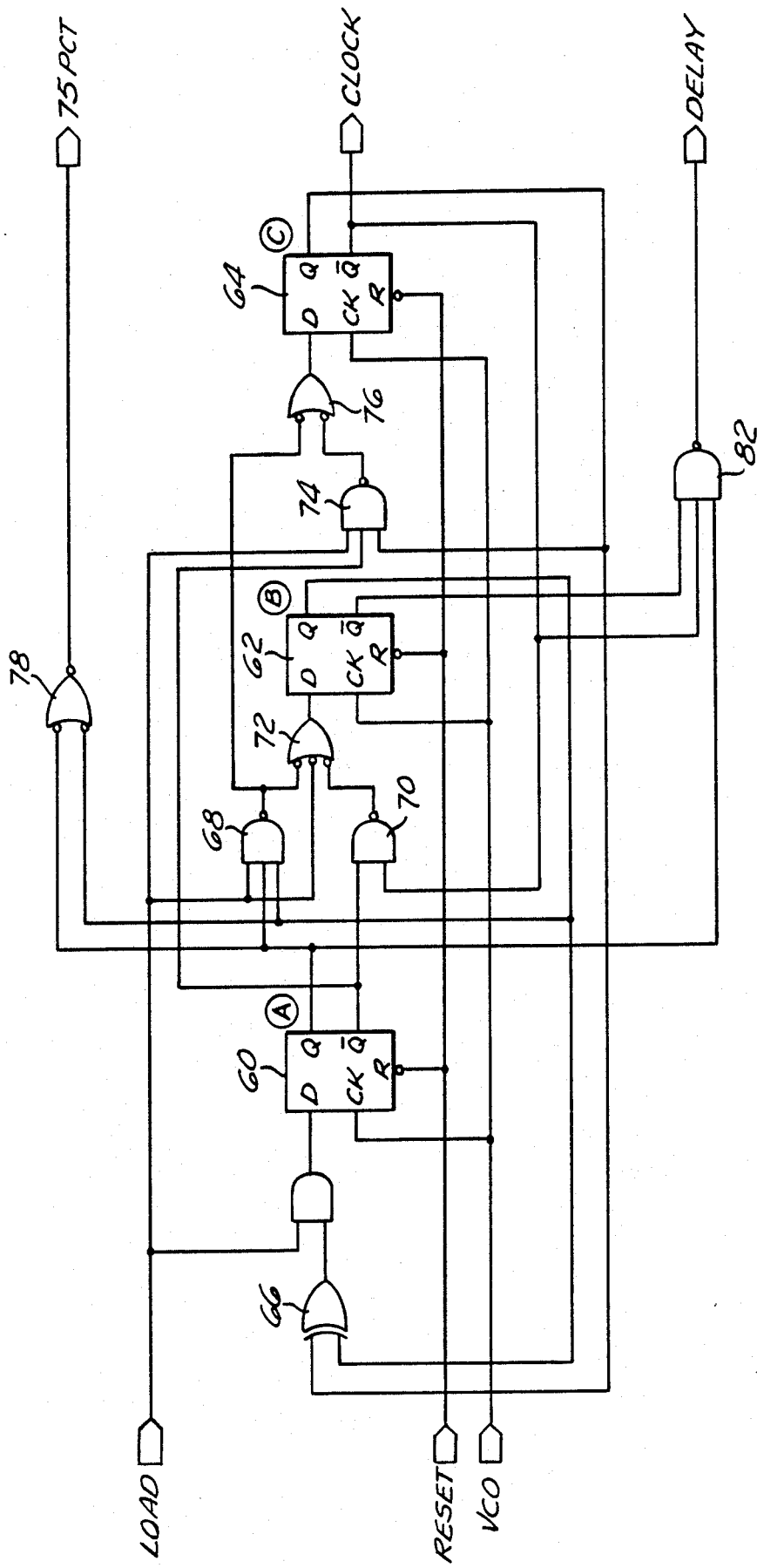
FIG. 7 is a circuit diagram of the frequency divider of FIG. 1.

The frequency divider 24 is clocked by the VCO signal provided by the voltage-controlled oscillator 30 to produce the clock ("CLOCK") signal discussed above which controls the rate at which data is output by the phase corrector 34. The frequency divider 24, the circuitry of which is shown in FIG. 7, is a 3-bit, divide-by-eight Gray code counter. The state of each bit of the 3-bit counter is stored by three D flip-flops 60, 62, 64. The flip-flops 60, 62, 64, which are clocked by the VCO signal, each generate a pair of outputs, Q and $\bar{Q}$, whose values depend upon the previous values of the outputs of the flip-flops 60, 62, 64. The following next state table provides the successive states of the Q outputs of each of the three flip-flops 60, 62, 64.

TABLE 1

| Row | C | B | A |
|-----|---|---|---|
| 1 | 0 | 0 | 0 |
| 2 | 0 | 1 | 0 |
| 3 | 0 | 1 | 1 |
| 4 | 1 | 1 | 1 |
| 5 | 1 | 1 | 0 |
| 6 | 1 | 0 | 0 |
| 7 | 1 | 0 | 1 |
| 8 | 0 | 0 | 1 |

In the above next state table, the column heading labeled "C" represents the Q output of flip-flop 64, the column heading labeled "B" represents the Q output of flip-flop 62, and the column heading labeled "A" represents the Q output of the flip-flop 60. Each row in the table represents the respective Q output values of the flip-flops 60, 62, 64 at a particular point in time. As time progresses, the values of the flip-flop Q outputs change in accordance with the values listed in each row, moving down the table with time. For example, if the Q outputs of the flip-flops 64, 62, 60 are 0, 0, 0, respectively (Row 1: C=0, B=0, A=0), then at the next rising edge of the VCO signal their values will be 0, 1, 0, respectively (Row 2: C=0, B=1, A=0), and upon the second rising edge of the VCO signal their values will be 0, 1, 1, respectively (Row 3: C=0, B=1, A=1).

When the flip-flop output values correspond to the values listed in Row 8, upon the next rising edge of the VCO signal they change to the values listed in Row 1, and continue changing in accordance with the table as described above.

The circuit elements connected to the D inputs of the flip-flops 60, 62, 64 have been chosen to yield flip-flop outputs in accordance with Table 1. The next state equations necessary to yield the Table 1 output values are listed and simplified below.

$$A = \bar{a}b\bar{c} + ab\bar{c} + \overline{abc} + a\bar{b}c \quad (1)$$
$$= (a + \bar{a})(b\bar{c}) + (\bar{a} + a)(\bar{b}c)$$
$$= b\bar{c} + \bar{b}c$$
$$A = b \oplus c$$

$$B = \overline{abc} + \bar{a}b\bar{c} + ab\bar{c} + abc \quad (2)$$
$$= \bar{a}\bar{c}(\bar{b} + b) + ab(\bar{c} + c)$$
$$B = \bar{a}\bar{c} + ab$$

$$C = ab\bar{c} + abc + \bar{a}bc + \overline{abc} \quad (3)$$
$$= ab(\bar{c} + c) + \bar{a}c(b + \bar{b})$$
$$C = ab + \bar{a}c$$

In the above equations, the capital letters A, B, C refer to the next state of the flip-flop Q outputs and the small letters a, b, c refer to the current Q output values of the flip-flop Q outputs. A bar over the small letters, e.g., $\bar{a}$, indicates the current $\bar{Q}$ output values of the flip-flops. The above equations, which were generated and simplified by well known logic design principles, indicate that each successive Q output of the flip-flops 60, 62, 64 is a function of the values of the current flip-flop output values.

These next state equations are implemented in the frequency divider circuitry to provide the desired flip-flop outputs. Equation (1) is implemented in the frequency divider circuitry by an EXCLUSIVE-OR gate 66. Equation (2) is implemented in the circuitry by a pair of NAND gates 68, 70 connected to an OR gate 72 with complemented inputs. Equation (3) is implemented by a NAND gate 74 and an OR gate 76 with complemented inputs. The Q outputs of the flip-flops 60, 62, 64 and the value of the VCO signal over time are illustrated in FIG. 8.

Figure 8:
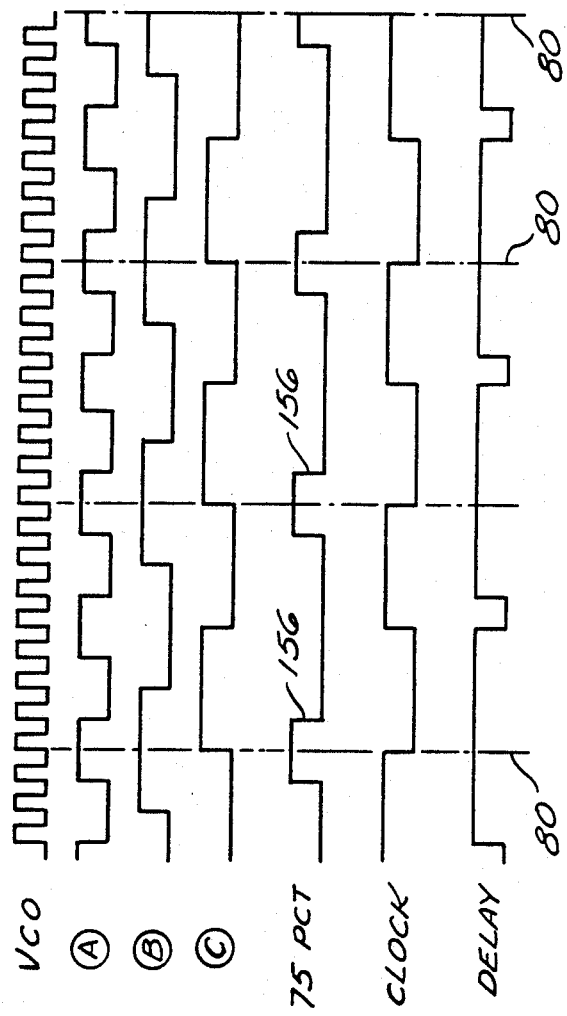
FIG. 8 illustrates a number of electrical waveforms generated in the frequency divider of FIG. 7.

The CLOCK signal generated by the frequency divider 24 is taken from the $\bar{Q}$ output of the flip-flop 64, and is shown in FIG. 8. As is apparent from Table 1 and FIG. 8, the frequency of the CLOCK signal is exactly one-eighth of the frequency of the VCO signal. Thus, any of the relatively low frequency variations produced by the tape transport system will occur in both the VCO signal and the CLOCK signal.

An important feature of the data smoother is the phase adjustment of the CLOCK signal after frequency lock has been established. As described above in connection with the discussion of the frequency lock detector 18, the LOAD signal is provided to the frequency divider 24 in order to adjust the phase of the CLOCK signal following the receipt of the preamble of each data block. The frequency comparator 20 adjusts the frequency of the voltage-controlled oscillator 30 during the receipt of the preamble. As a result, frequency lock is achieved at the end of the preamble. However, although the CLOCK signal frequency will correspond to the data signal frequency, these two signals may be out of phase, that is, each rising edge of the CLOCK signal may not coincide with each rising edge of the REF signal.

Figure 12:
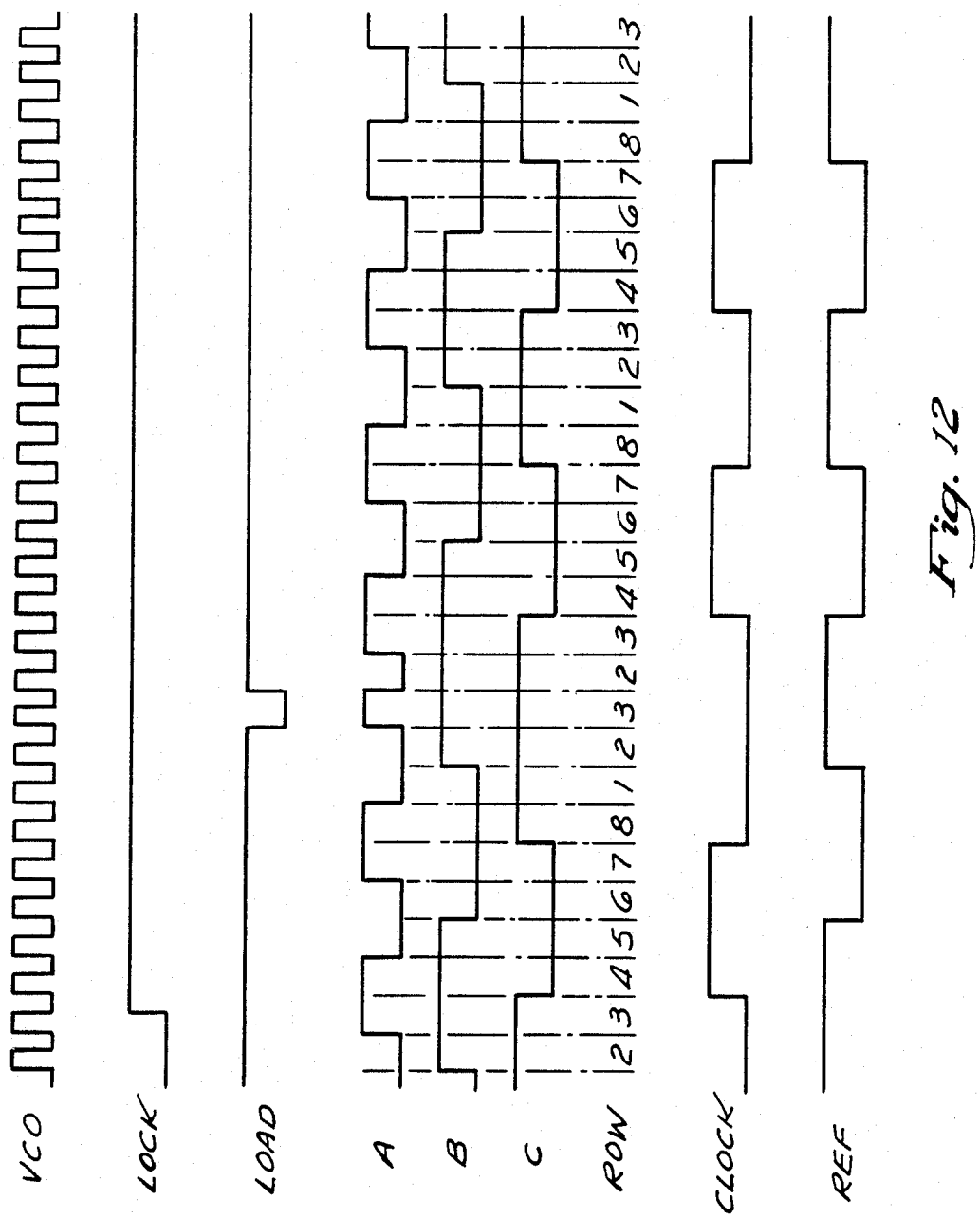
FIG. 12 illustrates a number of electrical waveforms generated in connection with a phase adjustment of a clock signal generated by the frequency divider of FIG. 7.

In order to substantially eliminate any phase difference between the CLOCK and REF signals after the receipt of the preamble, the LOAD signal forces the frequency divider flip-flops 60, 62, 64 to predetermined values, which correspond to the values listed in Row 2 in Table 1. This effectively shifts the phase of the CLOCK signal to put the CLOCK and REF signals in phase. This phase adjustment of the CLOCK signal is illustrated in FIG. 12. After the LOAD signal goes low, upon the next rising edge of the VCO signal, the outputs of the flip-flops 60, 62, 64 are forced to 0,1,0, respectively, which corresponds to Row 2 in Table 1. This ensures that upon the next rising edge of the REF signal, the CLOCK signal will be substantially in phase with the REF signal.

The frequency divider 24 also produces a seventy-five percent ("75PCT") signal from a NOR gate 78 with complemented inputs which is used by the phase corrector 34 to determine whether a data bit input to the data smoother has occurred outside a narrowed window within each bit cell. As FIG. 8 illustrates, the 75PCT signal is logic "0" for 75% of the interior portion of each bit cell. In FIG. 8, the edges of each bit cell are indicated by a number of lines 80. The effect of the 75PCT signal and the window within each bit cell is explained in more detail below in connection with the phase corrector 34.

The frequency divider 24 also produces a delay ("DELAY") signal via a NAND gate 82 which is illustrated in FIG. 8. The DELAY signal, which is provided to the phase comparator 22, is explained in more detail below in connection with the operation of the phase comparator 22.

Figure 5:
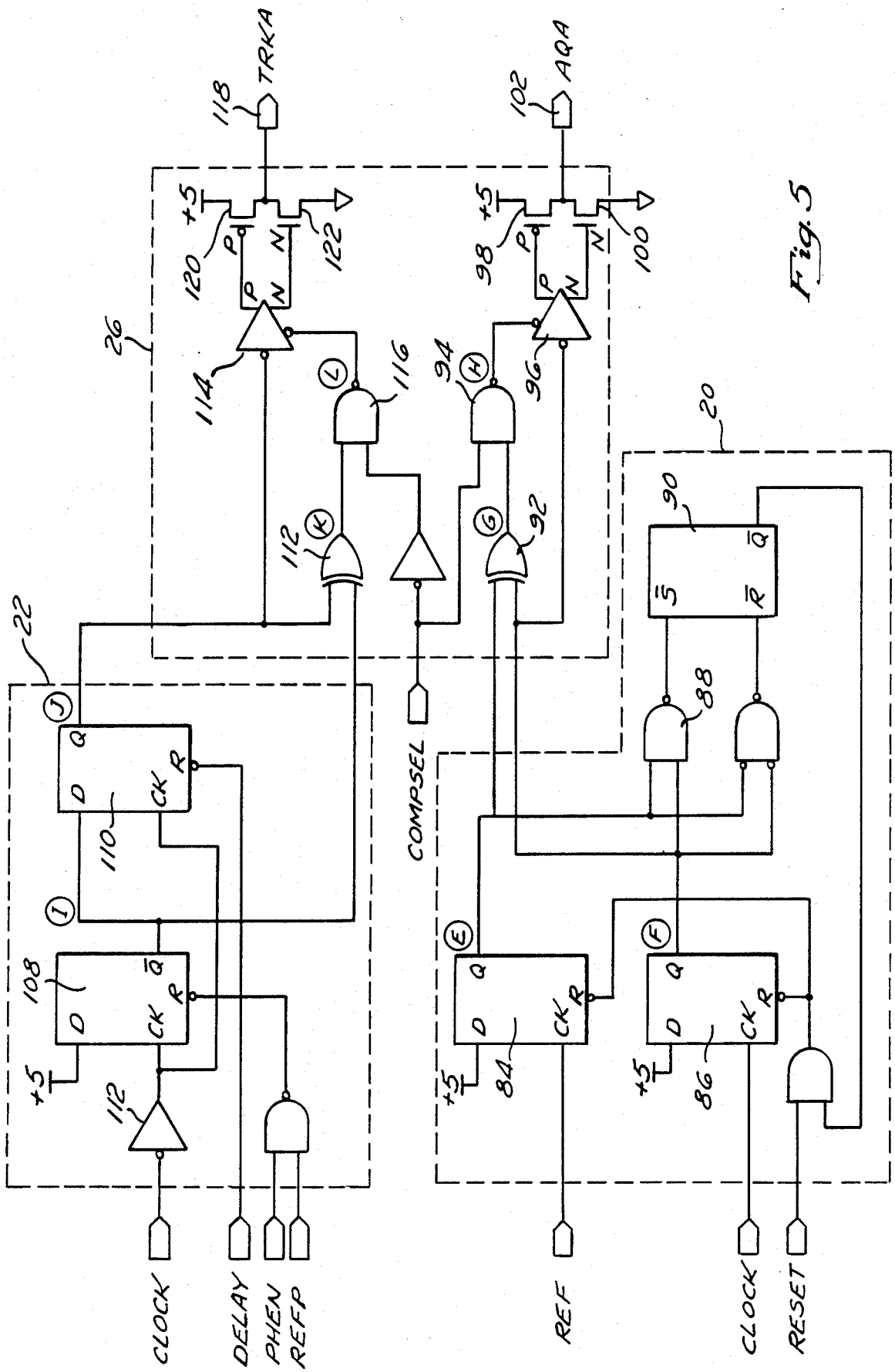
FIG. 5 is a circuit diagram of the phase comparator, the frequency comparator, and the selector of FIG. 1.

The circuitry of the frequency comparator 20 is shown in FIG. 5. The frequency comparator 20 includes a pair of D flip-flops 84, 86. The flip-flop 84 is clocked by the REF signal, which is the data signal input to the data smoother, while the flip-flop 86 is clocked by the CLOCK signal generated by the frequency divider 24. Together, the flip-flops 84, 86 continually detect the amount of phase difference between the REF signal and the CLOCK signal during the preamble of the data block, and cause the frequency of the VCO signal to be adjusted by an amount directly proportional to the phase difference detected.

The operation of the frequency comparator 20 is explained in connection with FIGS. 5 and 10. Since the D input of the flip-flop 84 is tied to logic "1," its Q output rises to logic "1" upon each rising edge of the REF signal, as is shown by waveform E in FIG. 10, which represents the value of the Q output of the flip-flop 84 over time. Similarly, as is shown by waveform F, the Q output of the flip-flop 86 rises upon each rising edge of the CLOCK signal.

Shorty after both flip-flop outputs rise to logic "1," both of the flip-flops 84, 86 are reset. This occurs as a result of the connection of the flip-flop outputs to a NAND gate and an $\overline{SR}$ flip-flop 90. As soon as both flip-flop outputs rise to logic "1," the output of the NAND gate 88 becomes logic "0," causing the $\bar{Q}$ output of the flip-flop 90 to become logic "0" and reset both the flip-flops 84, 86.

The Q outputs of the flip-flops 84, 86 are supplied to the selector 26, which performs some signal processing on the flip-flop outputs in order to generate a frequency acquisition adjust ("AQA") signal which is supplied to the charge pump 28 to adjust the frequency of the voltage-controlled oscillator 30. Specifically, the flip-flop outputs are supplied to an EXCLUSIVE-OR gate 92, which provides a logic "1" output when the values of its inputs are different. Referring now to waveform G in FIG. 10, the output of the EXCLUSIVE-OR gate 92 rises upon the rising edge of either the CLOCK signal or the REF signal, whichever occurs first, and then falls on the rising edge of the signal, either CLOCK or REF, which occurs later. Thus, the width of each pulse of the EXCLUSIVE-OR gate 92 output directly corresponds to the phase difference between the CLOCK and REF signals.

The EXCLUSIVE-OR gate 92 output is input to a NAND gate 94 along with the COMPSEL signal, which will be logic "1" when the output of the frequency comparator 20 is enabled. The NAND gate 94 output, which is shown as waveform H in FIG. 10, controls a buffer 96. When the NAND gate 94 output is low, the buffer 96 passes its input to the bases of a pair of CMOS transistors 98, 100. The buffer 96 receives the Q output of the flip-flop 86 and passes this input in inverted form to the bases of the transistors 98,100 when enabled by the NAND gate 94. If the output of the flip-flop 86 is high, the output of the buffer 96 will be low, and the transistor 98 will be turned on and the transistor 100 will be turned off. Thus, a high voltage will appear at an output 102 of the selector 26. If the output of the flip-flop 86 is low, the output of the buffer 96 will be high, and the transistor 98 will be turned off and the transistor 100 will be turned on. In this case, a low voltage will appear at the output 102. If the buffer 96 is not enabled, neither of the transistors 98, 100 will conduct.

The AQA signal adjusts the frequency of the voltage-controlled oscillator 30 during the input to the data smoother of the preamble of each data block. The AQA signal, shown in FIG. 10, consists of a number of positive pulses 104 and a number of negative pulses 106. The width of each of the pulses 104, 106 directly corresponds to the phase difference between the CLOCK signal and the REF signal, and the polarity of the pulses 104, 106 with respect to an intermediate voltage of approximately 2.5 volts depends upon whether the REF signal leads or lags the CLOCK signal. If the REF signal leads the CLOCK signal, that is, if the rising edge of the REF signal precedes the rising edge of the CLOCK signal, a negative pulse 106 having a magnitude of approximately zero volts is produced. If the REF signal lags the CLOCK signal, a positive pulse having a magnitude of approximately +5 volts is produced. When the AQA signal is high during the pulses 104, the voltage-controlled oscillator 30 is slowed down, and when the AQA signal is low during the pulses 106, the oscillator 30 speeds up. At all other times, the AQA signal is at an intermediate voltage of approximately 2.5 volts, which has no effect on the frequency of the oscillator 30. Thus, the frequency of the CLOCK signal is adjusted so that it corresponds to the frequency of the REF signal.

The operation of the frequency comparator 20 described above adjusts the frequency of the CLOCK signal during the preamble of each data block. After the preamble, when frequency lock is detected, the frequency comparator 20 output is disabled by the selector 26 and the phase comparator 22 output is enabled. The phase comparator 22 adjusts the frequency of the voltage-controlled oscillator 30 so that the phase of the CLOCK signal corresponds to the phase of the REF signal.

The circuitry of the phase comparator 22 is shown in FIG. 5. The phase comparator 22 includes a pair of D flip-flops 108, 110 which are clocked by the CLOCK signal through an inverter 112. The flip-flop 108 is initially reset upon the frequency lock by the PHEN signal generated by the frequency lock detector 18, and is periodically reset by the REFP signal generated by the pulse shaper 16.

Figure 11:
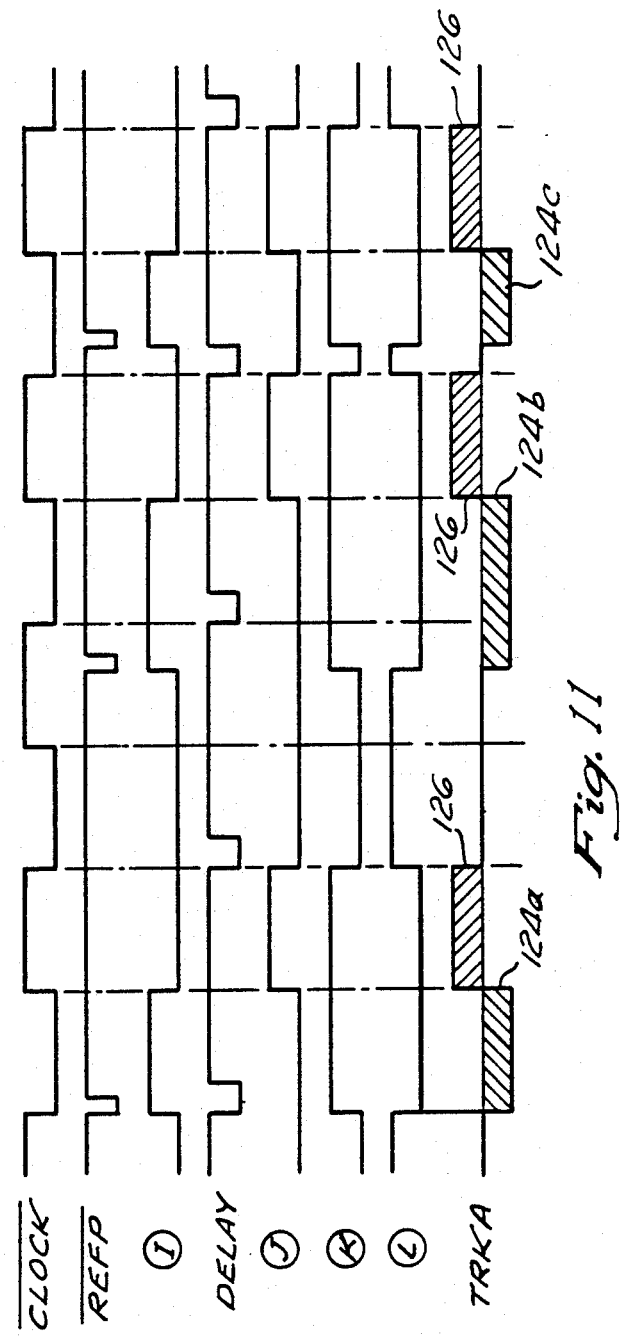
FIG. 11 illustrates a number of electrical waveforms generated in the phase comparator of FIG. 5.

The operation of the phase comparator 22 is explained is connection with FIGS. 5 and 11. Waveform I in FIG. 11 represents the value of the $\overline{Q}$ output of the flip-flop 108 over time. Since the D input of the flip-flop 108 is tied high, its $\overline{Q}$ output goes low upon each rising edge of the $\overline{CLOCK}$ signal. The $\overline{Q}$ output goes high each time the flip-flop 108 is reset, which occurs on the falling edge of $\overline{REFP}$. Waveform J represents the value of the Q output of the flip-flop 110 over time. This Q output rises upon the rising edge of the $\overline{CLOCK}$ signal if the D input of the flip-flop 110 is high, and the Q output goes low upon the next falling edge of the $\overline{DELAY}$ signal generated by the frequency divider 24.

The $\overline{Q}$ output of the flip-flop 108 and the Q output of the flip-flop 110 are provided to an EXCLUSIVE-OR gate 112 which controls the activation of a buffer 114 through a NAND gate 116. Waveform K represents the output of the EXCLUSIVE-OR gate 112. This output is high whenever the inputs to the EXCLUSIVE-OR gate are different. In FIG. 11, waveform K goes high upon the rising edge of waveform I and goes low upon the falling edge of waveform J. When waveform K is high, the buffer 114 is activated and generates either a high or a low voltage at an output 118, depending upon the input to the buffer 114.

Waveform J, which represents the Q output of the flip-flop 110, is input to the buffer 114. When the buffer 114 is enabled and J is high, the buffer 114 passes a low signal to the bases of a pair of CMOS transistors 120, 122, which turns the transistor 120 on and the transistor 122 off. Since transistor 120 is conducting, a high voltage is presented to the output 118. When the buffer 114 is enabled and J is low, the buffer passes a high signal to the transistors 120, 122, which turns the transistor 120 off and the transistor 122 on. Since transistor 122 is now conducting, the output 118 is effectively connected to ground and therefore has a low voltage. When the buffer 114 is not enabled, neither of the transistors 120, 122 conducts, and an intermediate voltage of approximately 2.5 volts is produced at their junction.

The value of the output 118 over time is illustrated in FIG. 11 as a tracking adjustment ("TRKA") signal. When the TRKA signal is high, which occurs during a number of pulses 126, the frequency of the voltage-controlled oscillator 30 is decreased. When the TRKA signal is low, which occurs during pulses 124, the frequency of the oscillator 30 is increased. At all other times, the frequency of the oscillator 30 is unaffected by the TRKA signal.

If the falling edge of the $\overline{REFP}$ signal exactly corresponds in time to the falling edge of the $\overline{CLOCK}$ signal, the two signals are exactly in phase. In this case, the width of the TRKA signal negative pulse 124a exactly corresponds to the width of one-half cycle of the $\overline{CLOCK}$ signal. The width of the TRKA signal positive pulses 126 correspond to the width of one-half cycle of the $\overline{CLOCK}$ signal, regardless of the phase relationship between the $\overline{\text{REFP}}$ signal and the $\overline{\text{CLOCK}}$ signal. As a result, when the $\overline{\text{REFP}}$ signal and $\overline{\text{REFP}}$ signals are exactly in phase, the width of the pulse 124a equals the width of the pulse 126, and the net change in the frequency of the voltage-controlled oscillator 30 is zero.

If the falling edge of the $\overline{\text{REFP}}$ signal leads, or precedes, the falling edge of the $\overline{\text{CLOCK}}$ signal, then the width of the negative pulse 124b of the TRKA signal exceeds the constant one-half $\overline{\text{CLOCK}}$ cycle width of the positive pulse 126, and the frequency of the oscillator 30 is increased by an amount directly proportional to the difference between the widths of the pulses 124b, 126.

If the falling edge of the $\overline{\text{REFP}}$ signal lags the falling edge of the $\overline{\text{CLOCK}}$ signal, then the width of the negative pulse 124c of the TRKA signal is less than that constant one-half $\overline{\text{CLOCK}}$ cycle width of the positive pulse 126, and the frequency of the oscillator 30 is decreased by an amount directly proportional to the difference between the widths of the pulses 124c, 126. Thus, the adjustment of the oscillator 30 frequency depends on the difference between the variable-width pulses 124 and the constant-width pulses 126.

An important feature of this described embodiment of the data smoother is the generation of the pulses 126. The pulses 126 are generated from the $\overline{\text{CLOCK}}$ to have a width of exactly one-half the period of the $\overline{\text{CLOCK}}$ signal. This is accomplished in part by the DELAY signal provided to the reset pin of the flip-flop 110. Since the pulses 126 are exactly one-half the width of the $\overline{\text{RFP}}$ signal period, the width of the pulses 126 varies with the frequency of the CLOCK signal, which tracks the frequency of the REF signal.

As discussed above, some data smoothers adjust their clock frequencies based upon pulses which have fixed widths that do not vary with the data rate. The width of these pulses is determined from a predetermined nominal data rate, not the actual data rate. Since the actual data rate may not equal the nominal rate, these data smoothers do not properly adjust their internal clock frequencies.

The described embodiment of the data smoother, by adjusting the width of the pulses 126 based upon the data rate, properly adjusts the clock frequency depending upon the actual data rate. This is a advantageous because the purpose of the data smoother is to track the actual fluctuating data rate, and not some predetermined, fixed nominal data rate.

Another advantage of the described embodiment is that the magnitude of the net adjustment of the frequency of the voltage-controlled oscillator 30 is exactly proportional to the phase difference between the oscillator frequency and the frequency of the data input to the data smoother. This exact correspondence of net adjustment to phase difference is accomplished by the exact correspondence of each falling edge of the $\overline{\text{REFP}}$ signal to the leading edge of the pulses 124. Since the leading edges of the pulses 124 may exactly correspond to the data signal, whenever the data signal is input to the data smoother, the frequency adjust sensitivity is effectively infinite.

Figure 6:
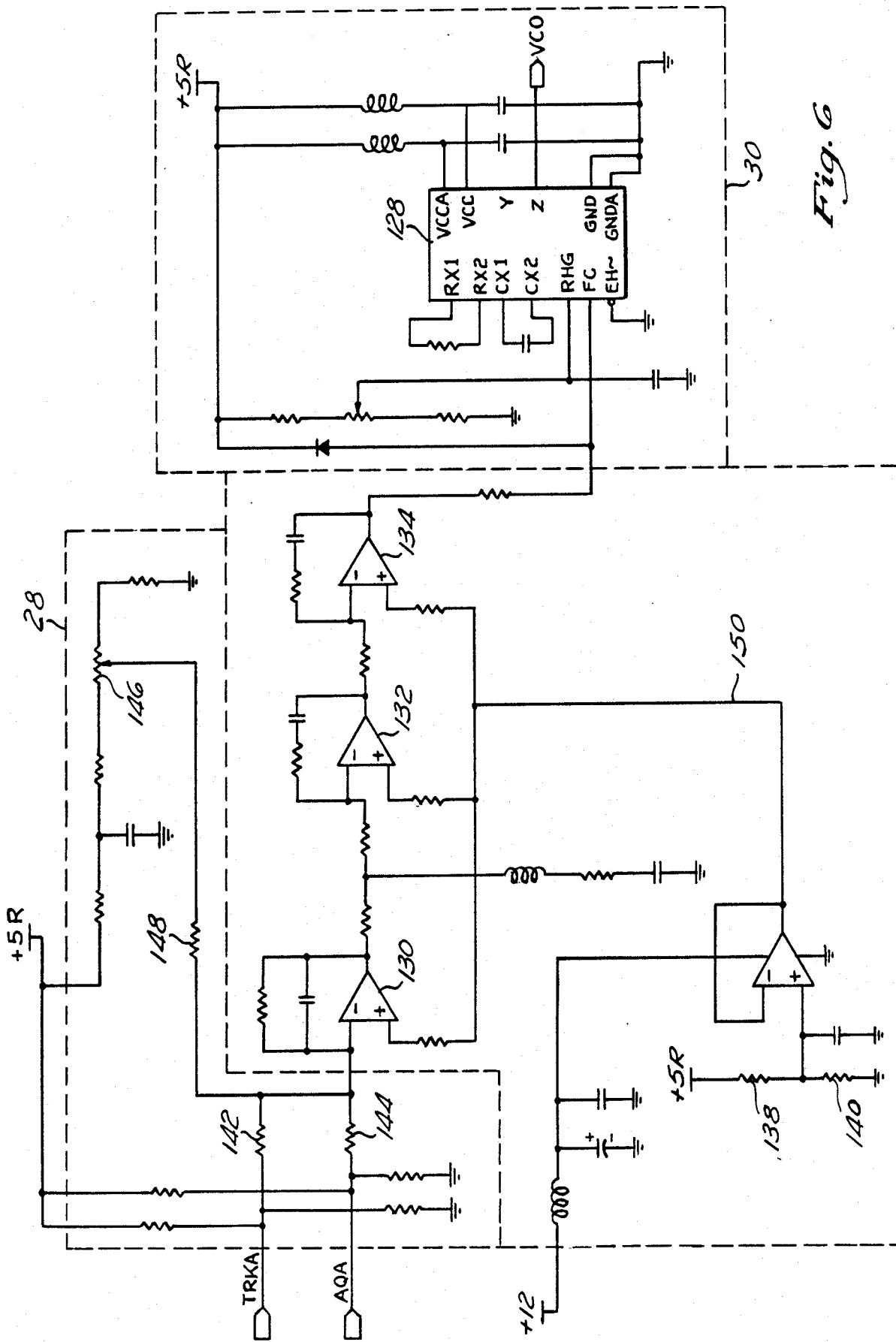
FIG. 6 is a circuit diagram of the charge pump, the filter and the voltage-controlled oscillator of FIG. 1.

Now referring to FIG. 6, the TRKA and AQA signals are supplied to the charge pump 28, which is coupled to the voltage-controlled oscillator 30 through the filter 32. The oscillator 30 includes an oscillator chip 128, which may be a 74LS628 chip which is commercially available from Texas Instruments. The frequency of oscillation of the chip 128 depends upon the voltage supplied to its FC input. The chip 128 generates an output ("VCO") signal which is used to drive the frequency divider 24.

The filter 32 includes three optional amplifiers 130, 132, 134 and a fourth operational amplifier 136 whose output is coupled to each of the noninverting inputs of the amplifiers 130, 132, 134. The amplifier 136 has its noninverting input coupled between a pair of resistors 138, 140 having equal resistance values which are connected between a five volt regulated power supply and ground. Thus, the voltage at the noninverting input is 2.5 volts. Since the inverting input of the amplifier 136 is coupled to its output, its output and the noninverting inputs of the amplifiers 130, 132, 134 to which it is coupled are also held at 2.5 volts.

The main function of the filter 32 is to filter out high frequency variations in the data rate caused by the peak shift effect and noise described above, but to let lower frequency variations induced by the tape transport system to pass. To accomplish the foregoing, the filter 32 has a relatively high gain at lower frequencies, which decreases at higher frequencies so that it is not responsive to high frequency variations in the data rate.

The charge pump 28 is coupled to the inverting input of the operational amplifier 130. As discussed above, the noninverting input of this amplifier is held at 2.5 volts by the amplifier 136. Since the amplifier 130 holds the voltage at its two inputs substantially equal, the voltage at the inverting input of the amplifier 130 is also at 2.5 volts. A pair of resistors 142, 144, which are connected to the same inverting input, receive the TRKA and AQA signals, respectively, generated by the selector 26.

The operation of the charge pump 28 is explained with reference to FIGS. 5 and 6. As described above, at any time during data input to the data smoother, either the buffer 114 or the buffer 96 is activated, as determined by the COMPSEL signal. When the buffer 96 is activated, which occurs during the pulses 104, 106 illustrated in FIG. 10, one of the transistors 98, 100 conducts and effectively couples the resistor 144 in the charge pump 28 to either ±5 volts or ground. If the transistor 98 conducts and supplies ±5 volts to the resistor 144, which occurs during to the pulses 104 in FIG. 10, current is injected into the charge pump 28 and causes the frequency of the voltage-controlled oscillator 30 to decrease. Since the inverting pinput of the amplifier is held at 2.5 volts, the magnitude of this injected current is the voltage drop across the resistor 144, 2.5 volts, divided by the value of the resistor 142.

Figure 10:
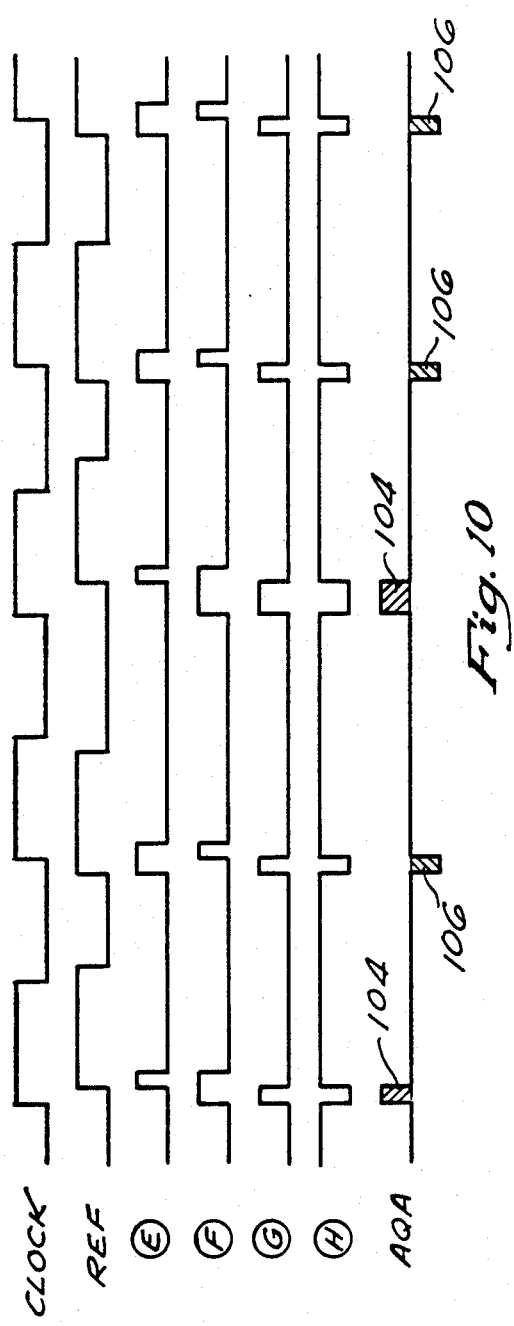
FIG. 10 illustrates a number of electrical waveforms generated in the frequency comparator of FIG. 5.

When the buffer 96 is activated and the transistor 100 conducts and supplies a ground to the resistor 144, which occurs during the pulses 106 in FIG. 10, current flows from the filter 32 through the resistor 144 and through the transistor 100. Since the voltage drop across the resistor 144 is also 2.5 volts when current flows in this opposite direction, the magnitude of the current is the same. When current flows out of the charge pump 28 in this manner, the frequency of the voltage-controlled oscillator 30 is increased.

When the buffer 96 is not activated, neither transistor 98, 100 conducts. As a result, the output 102 appears to the charge pump 28 to be an open circuit, and no current flows through the resistor 144 in either direction. Thus, the frequency of the voltage-controlled oscillator 30 is not affected.

The effect of the TRKA signal on the charge pump 28 is analogous to that of the AQA signal. When the buffer 114 is activated and the TRKA signal is high, which occurs during the pulses 126 in FIG. 11, current is injected into the charge pump 28, thus decreasing the frequency of the voltage-controlled oscillator 30. When the buffer 114 is activated and the TRKA signal is low, which occurs during the pulses 124 in FIG. 11, current flows from the charge pump 28 to the selector 26, thus increasing the frequency of the oscillator 30. When the buffer 114 is not activated, which occurs at all times other than during the pulses 124, 126 in FIG. 11, no current flows between the charge pump 28 and the selector 26, and the frequency of the oscillator 30 is unaffected.

The charge pump 28 also includes a potentiometer 146 coupled to the inverting input of the amplifier 130. The potentiometer 146 is coupled between a five volt regulated power supply and ground. The purpose of the potentiometer is to provide an additional current into or out of the charge pump 28 in order to ensure that the oscillator 30 can track the frequency of the data signal without a steady state phase error. The potentiometer 146 is adjusted so that the voltage seen by its center tap is slightly above or below 2.5 volts, depending upon the desired phase compensation. When the center tap voltage is slightly above 2.5 volts, extra current is injected through a resistor 148 towards the inverting input of the amplifier 130. When the center tap voltage is slightly below 2.5 volts, a current flows through the resistor 148 in the opposite direction. These currents are independent of the currents produced by the TRKA and AQA signals.

Figure 4:
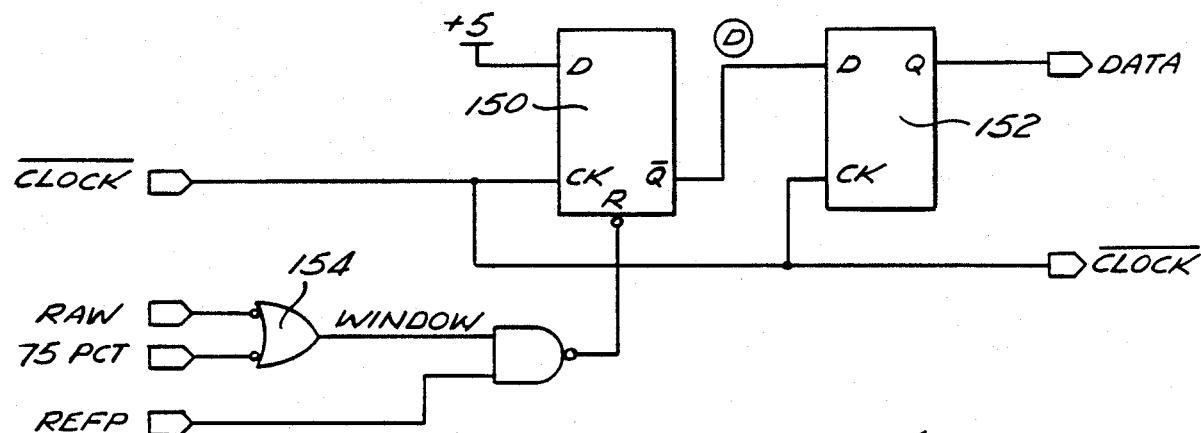
FIG. 4 is a circuit diagram of the phase corrector of FIG. 1.
Figure 9:
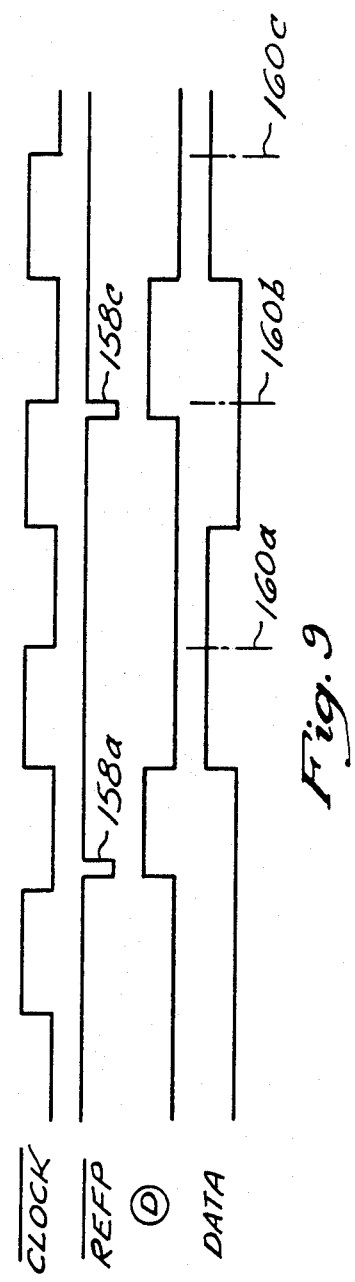
FIG. 9 illustrates a number of electrical waveforms generated in the phase corrector of FIG. 4.

The circuit diagram of the phase corrector 34 is shown in FIG. 4. The phase corrector 34 includes a pair of D flip-flops 150, 152 which are clocked by the $\overline{\text{CLOCK}}$ signal. The operation of the phase corrector 34 is explained in connection with FIGS. 4 and 9. The $\overline{Q}$ output of the flip-flop 150, which is represented by waveform D in FIG. 9, rises at each falling edge of the $\overline{\text{REFP}}$ and then goes low upon the rising edge of the $\overline{\text{CLOCK}}$. The waveform D is supplied to the D input of the flip-flop 152, which produces a data ("DATA") signal at its Q output. The DATA signal goes high at the rising edge of the $\overline{\text{CLOCK}}$ if its D input is high. The DATA signal goes low in the absence of a data pulse 158 during a cycle of the $\overline{\text{CLOCK}}$.

The data input to the data smoother is "edge-sensitive" in that the leading edges of the REF and $\overline{\text{REFP}}$ signals define the occurrence in time of the data. However, the DATA signal output by the phase corrector 34 is "level-sensitive," that is, a high level DATA signal indicates the presence of a data pulse 158, while a low level DATA signal indicates the absence of a data pulse 158. The $\overline{\text{CLOCK}}$ output by the phase corrector 34 is used to read the level of the DATA signal at a rate equal to the frequency of the $\overline{\text{CLOCK}}$. For example, the DATA signal would be read at times indicated by the lines 160. The level of the DATA signal is high at the times indicated by the lines 160a, 160c due to the presence of the data pulses 158a, 158c, but the DATA signal is low at the time indicated by the line 160b due to the absence of a data pulse 158b between the pulses 158a, 158c.

A window ("WINDOW") signal is also provided to the reset pin of the flip-flop 150. The WINDOW signal is used in connection with a read-after-write acknowledgment procedure in which data is read from the tape just after it is written in order to verify that the data was correctly recorded. If the data read by the tape drive is the same as the data that was written, the data was written to the tape without error. If the data does not correspond, the data block is rewritten. This read-after-write procedure includes the use of a narrowed window within each bit cell. The narrowed window is centered within the bit cell and occupies 75 percent of its width. Where the data is read from the tape just after being written, any data bits which were written outside of the window are disregarded upon being read back. Thus, if a data bit is written outside of the window, a read-after-write error is triggered and the data block is rewritten. The use of the window thus assures a minimum level of data uniformity on the tape.

Referring now to FIGS. 4 and 8, the WINDOW signal is generated by a NOR gate 154 with complemented inputs. The WINDOW signal is logic "0" when a read-after write ("RAW") signal is logic "1," indicating that the read-after-write procedure is being used, and the 75PCT signal is logic "1," indicating the outside of the window within the bit cell. This latter time occurs during the pulses 156 in FIG. 8. When the WINDOW signal is logic "0," the $\overline{\text{REFP}}$ signal is effectively ignored by the flip-flop 150.

Modifications and alternative embodiments of the invention will be apparent to those skilled in the art in view of the foregoing description. Accordingly, this description of a preferred embodiment is to be construed as illustrative only, and is for the purposes of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A data smoother for a streaming cartridge tape drive, said data smoother comprising:

means for generating a clock signal having first and second signal transitions in each cycle thereof;

a phase comparator that compares the phase of said clock signal to the phase of a data signal which is input to said data smoother, said input data signal comprising a sequence of data pulses, said phase comparator providing a comparator output signal having a first level that begins at the beginning of a data pulse and that ends at one of said first and second transitions of said clock signal, said comparator output signal having a second level that begins when said first level ends and that ends at the other of said first and second transitions of said clock signal, the duration of said second level being a fixed percentage of the duration of one cycle of said clock signal, the duration of said first level varying in accordance with the phase difference between said clock signal and said input data signal;

means coupled to receive said comparator output signal for increasing the frequency of said clock signal when said input data signal leads said clock signal and for decreasing the frequency of said clock signal when said input data signal lags said clock signal; and means for generating an output data signal from said input data signal, said output data signal being output from said data smoother at a rate controlled by said clock signal.

2. A data smoother as defined in claim 1, additionally comprising means for selectively filtering variations in said comparator output signal caused by variations in the frequency of said input data signal.

3. A data smoother as defined in claim 2, wherein said selectively filtering means filters out variations in said comparator output signal caused by high frequency variations in said input data signal induced by peak shift or noise.

4. A data smoother as defined in claim3 wherein the frequency of said clock signal tracks the frequency variations in said input data signal induced by tape speed variation.

5. A data smoother as defined in claim 4 wherein said means for generating a clock signal comprises an oscillator.

6. A data smoother as defined in claim 5 wherein said means for generating a clock signal additionally comprises a frequency divider coupled to said oscillator.

7. A data smoother defined in claim 1, wherein said phase comparator comprises:
first means for detecting said beginning of said data pulse of said input data signal; and
second means for detecting said one of said first and second transitions of said clock signal only when said first means detects said beginning of said data pulse.

8. A data smoother as defined in claim 7, wherein each of said first and second detecting means comprises a flip-flop.

9. A data smoother as defined in claim 8, wherein said phase comparator additionally comprises an exclusive-or gate coupled to the output of each of said first and second detecting means.

10. A data smoother as defined in claim 1, additionally comprising a frequency comparator.

11. A data smoother as defined in claim 10 additionally comprising means for alternatively selecting the output of said frequency comparator or the output of said phase comparator, the selected output adjusting the frequency of said clock signal.

12. A data smoother as defined in claim 11 wherein the output of said frequency comparator is selected during the preamble portion of said input data signal and the output of said phase comparator is selected after the preamble portion of said input data signal.

13. A data smoother as defined in claim 12 wherein said frequency comparator causes frequency lock to be established between said input data signal and said clock signal during the preamble portion of said input data signal.

14. A data smoother for a streaming cartridge tape drive, said data smoother comprising:
means for generating a clock signal;
means for comparing the phase of said clock signal to the phase of a data signal which is input to said data smoother, said phase comparing means comprising a frequency comparator and a phase comparator;
means coupled to said phase comparing means for increasing the frequency of said clock signal when said input data signal leads said clock signal by an amount directly proportional to the phase difference between said clock signal and said input data signal;
means coupled to said phase comparing means for decreasing the frequency of said clock signal when said input data signal lags said clock signal by an amount directly proportional to the phase difference between said clock signal and said input data signal;
means for alternatively selecting the output of said frequency comparator or the output of said phase comparator as the output of said phase comparing means, the selected output adjusting the frequency of said clock signal, said output of said frequency comparator being selected during the preamble portion of said input data signal and the output of said phase comparator being selected after the preamble portion of said input data signal, said frequency comparator causing frequency lock to be established between said input data signal and said clock signal during the preamble portion of said input data signal;
means for initially adjusting the phase of said clock signal to correspond to the phase of said input data signal after frequency lock is established between said input data signal and said clock signal; and
means for generating an output data signal from said input data signal, said output data signal being output from said data smoother at a rate controlled by said clock signal.

15. A data smoother as defined in claim 14 wherein said phase comparator maintains phase lock between said input data signal and said clock signal after frequency lock is established.

16. A data smoother for a streaming cartridge tape drive, said data smoother comprising:
an oscillator for generating a clock signal;
a phase comparator that detects the phase difference between said clock signal and a data signal which is input to said data smoother, said input data signal comprising a sequence of data pulses, said phase comparator providing a comparator output signal having a first level that begins at the beginning of a data pulse and that ends at one of said first and second transitions of said clock signal, said comparator output signal having a second level that begins when said first level ends and that ends at the other of said first and second transitions of said clock signal, the duration of said second level being a fixed percentage of the duration of one cycle of said clock signal, the duration of said first level varying in accordance with the phase difference between said clock signal and said input data signal;
a circuit coupled to said phase comparator for changing the frequency of oscillation of said oscillator based upon the phase difference detected by said phase comparator, the frequency of said oscillator being increased when said comparator output signal has said first signal level, the frequency of said oscillator being decreased when said comparator output signal has said second signal level; and
a circuit for generating an output data signal from said input data signal, said output data signal being output from said data smoother at a rate controlled by said clock signal.

17. A data smoother as defined in claim 16 wherein said oscillator comprises:
a voltage-controlled oscillator for generating a periodic signal; and
a frequency divider coupled to said voltage-controlled oscillator for generating said clock signal from said periodic signal.

18. A data smoother as defined in claim 16, wherein said phase comparator output signal comprises a frequency adjust signal having said first and second levels, the difference between the duration of said first level and the duration of said second level being directly proportional to the difference in time between the difference in phase between said input data signal and said clock signal, said frequency adjust signal being used to adjust the frequency of said oscillator.

19. A data smoother as defined in claim 18 wherein said frequency adjust signal is supplied to said oscillator through a filter.

20. A data smoother as defined in claim 19, wherein said filter removes variations in said frequency adjust signal caused by high frequency variations in said input data signal induced by peak shift or noise.

21. A data smoother as defined in claim 20, wherein said filter passes variations in said frequency adjust signal caused by frequency variations in said input data signal induced by tape speed variations.

22. A data smoother as defined in claim 16, wherein said phase comparator comprises a pair of flip-flops.

23. A data smoother as defined in claim 22 wherein said phase comparator additionally comprises an exclusive-or gate coupled to said flip-flops.

24. A data smoother as defined in claim 16, additionally comprising:
 a frequency comparator; and
 a selector for alternatively selecting the outputs of said phase comparator an said frequency comparator, the selected output adjusting the frequency of said clock signal.

25. A data smoother as defined in claim 24 wherein the output of said frequency comparator is selected during the preamble portion of said input data signal and the output of said phase comparator is selected after the preamble portion of said input data signal.

26. A data smoother as defined in claim 25 wherein said frequency comparator causes frequency lock to be established between said input data signal and said clock signal during the preamble portion of said input data signal.

27. A data smoother for a streaming cartridge tape drive, said data smoother comprising:
 an oscillator for generating a clock signal;
 a phase comparator for detecting the phase difference between said clock signal and a data signal which is input to said data smoother, said phase comparator detecting the phase of said clock signal and the phase of said input data signal by detecting the time occurrence of an edge of said clock signal and the time occurrence of a corresponding edge of said input data signal, said phase comparator generating a frequency adjust signal which is directly proportional to the difference in time between said time occurrences, said frequency adjust signal being used to adjust the frequency of said oscillator;
 a frequency comparator for detecting the phase difference between said clock signal and said input data signal;
 a selector for alternatively selecting the outputs of said phase comparator and said frequency comparator, the selected output adjusting the frequency of said clock signal, the output of said frequency comparator being selected during the preamble portion of said input data signal and the output of said phase comparator being selected after the preamble portion of said input data signal, said frequency comparator causing frequency lock to be established between said input data signal and said clock signal during the preamble portion of said input data signal;
 a circuit coupled to receive the selected output of said phase comparator and said frequency comparator for changing the frequency of oscillation of said oscillator based upon the phase difference detected by said phase comparator, the frequency of said oscillator being increased when said input data signal leads said clock signal by an amount directly proportional to the phase difference between said clock signal and said input data signal, the frequency of said oscillator being decreased when said input data signal lags said clock signal by an amount directly proportional to the phase difference between said clock signal and said input data signal;
 means for initially adjusting the phase of said clock signal to correspond to the phase of said input data signal after frequency lock is established between said input data signal and said clock signal; and
 a circuit for generating an output data signal from said input data signal, said output data signal being output from said data smoother at a rate controlled by said clock signal.

28. A data smoother as defined in claim 27 wherein said phase comparator maintains phase lock between said input data signal and said clock signal after frequency lock is established.

29. A data smoother for a streaming cartridge tape drive, said data smoother comprising:
 means for generating a clock signal;
 means for detecting a first time duration between a first phase of said clock signal and a phase of data signal which is input to said data smoother and for detecting a second time duration between said first phase of said clock signal and a second phase of said clock signal;
 means coupled to said detecting means for adjusting the frequency of said clock signal by an amount responsive to the difference between said first time duration and said second time duration, said difference between said first time duration and said second time duration corresponding to the phase difference between said clock signal and said input data signal; and
 means for generating an output data signal from said input data signal, said output data signal being output from said data smoother at a rate controlled by said clock signal.

30. A data smoother as defined in claim 29 wherein said means for generating a clock signal comprises an oscillator coupled to a frequency divider.

31. A data smoother as defined in claim 30, wherein the first time duration between the phase of said input data signal and the phase of said clock signal is detected by detecting the time of occurrence of an edge of each of said signals.

32. A data smoother as defined in claim 31 wherein said detecting means comprises a pair of flip-flops.

33. A data smoother as defined in claim 32 additionally comprising means for generating a frequency adjust signal which is directly proportional to the difference in time between said time occurrences, said frequency adjust signal being used to adjust the frequency of said oscillator.

34. A data smoother as defined in claim 33 wherein said frequency adjust signal generating means comprises an exclusive-or gate.

35. A data smoother for generating a clock signal and a data signal from a data signal generated from a tape in a streaming cartridge tape drive, said data smoother comprising:

means for generating a clock signal;

first means for adjusting the frequency of said clock signal based upon the phase of a data signal which is input to said data smoother to establish frequency lock between said input data signal and said clock signal during the preamble portion of said input data signal when said input data signal comprises a predetermined sequence of consecutive data pulses, said first means providing a first output signal that having a level and a time duration that varies in accordance with the phase difference between said data signal and said clock signal;

second means for adjusting the frequency of said clock signal based upon the phase of said input data signal during the data portion of said input data signal when said input data signal comprises a plurality of data pulses that are spaced apart in time in accordance with a data pattern encoded on said tape in said streaming cartridge tape drive, said second means providing a second output signal having a first level that begins at the leading edge of a data pulse and that ends at a first phase of said clock signal and having a second level that begins when said first level ends and that ends at a second phase of said clock signal;

means for performing an initial adjustment of the phase of said clock signal so that the phase of said clock signal corresponds to the phase of said input data signal after frequency lock is established between said input data signal and said clock signal;

means for alternatively selecting the output signal from one of said first and second frequency adjusting means, said selected output signal provided as an input to said generating means, said generating means varying the frequency of said clock signal in accordance with the level and duration of the selected output signal; and means for generating an output data signal from said input data signal, said output data signal being output at a rate controlled by said clock signal.

36. A data smoother as defined in claim 35 wherein said first frequency adjusting means is a frequency comparator and said second frequency adjusting means is a phase comparator.

37. A data smoother for generating a clock signal and a data signal from a data signal generated from a tape in a streaming cartridge tape drive, said data smoother comprising:

means for generating a clock signal;

a frequency comparator that adjusts the frequency of said clock signal based upon the phase of a data signal which is input to said data smoother to establish frequency lock between said input data signal and said clock signal during the preamble portion of said input data signal when said input data signal comprises a predetermined sequence of constructive data pulses;

a phase comparator that adjusts the frequency of said clock signal based upon the phase of said input data signal during the data portion of said input data signal when said input data signal comprises a plurality of data pulses that are spaced apart in time in accordance with ad data pattern encoded on said tape in said streaming cartridge tape drive;

means for performing an initial adjustment of the phase of said clock signal so that the phase of said clock signal corresponds to the phase of said input data signal after frequency lock is established between said input data signal and said clock signal, said means for performing an initial adjustment including a counter, said initial adjustment being accomplished by setting said counter to a predetermined state;

means for alternatively selecting the output of said frequency comparator and said phase comparator; and means for generating an output data signal from said input data signal, said output data signal being output at a rate controlled by said clock signal.

38. A data smoother as defined in claim 37 wherein said phase comparator maintains phase lock between said input data signal and said clock signal after frequency lock is established.

* * * * *